United States Patent
Saito

(10) Patent No.: US 12,000,457 B2
(45) Date of Patent: Jun. 4, 2024

(54) CHAIN

(71) Applicant: TSUBAKIMOTO CHAIN CO., Osaka (JP)

(72) Inventor: Yusuke Saito, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/127,117

(22) Filed: Mar. 28, 2023

(65) Prior Publication Data
US 2023/0313863 A1     Oct. 5, 2023

(30) Foreign Application Priority Data
Mar. 30, 2022 (JP) .................. 2022-055147

(51) Int. Cl.
*F16G 13/06*     (2006.01)

(52) U.S. Cl.
CPC .................. *F16G 13/06* (2013.01)

(58) Field of Classification Search
CPC .......... F16G 13/06; F16G 13/07; F16G 13/08; B21L 9/00
USPC ....................................................... 474/230
See application file for complete search history.

(56) References Cited

U.S. PATENT DOCUMENTS

| | | | |
|---|---|---|---|
| 2009/0286634 A1 | 11/2009 | Takagishi | |
| 2013/0165285 A1* | 6/2013 | Hamaguchi | F16G 13/04 474/215 |
| 2014/0357440 A1 | 12/2014 | Yokoyama | |
| 2016/0040752 A1* | 2/2016 | Sato | F16G 13/04 474/215 |

FOREIGN PATENT DOCUMENTS

| | | | | |
|---|---|---|---|---|
| EP | 1645528 | A1 | 4/2006 | |
| JP | 5-71506 | U | 9/1993 | |
| JP | 2006-103884 | A | 4/2006 | |
| JP | 2006103884 | A * | 4/2006 | ............. B65G 17/38 |
| JP | 2009-275866 | A | 11/2009 | |
| JP | 2009275866 | A * | 11/2009 | ............. F16G 13/06 |
| JP | 2014-234881 | A | 12/2014 | |

OTHER PUBLICATIONS

Translation.*
Extended European Search Report dated Sep. 11, 2023, issued in counterpart EP Application No. 23164518.5. (6 pages).

* cited by examiner

*Primary Examiner* — Gene O Crawford
*Assistant Examiner* — Emily R Kincaid
(74) *Attorney, Agent, or Firm* — WHDA, LLP

(57) ABSTRACT

An object of the present invention is to provide a chain that is easy to assemble, has a longer life and smaller size, and allows larger tolerance for misalignment. The object is achieved by a chain including a plurality of outer links each having a pair of outer plates and pins, and a plurality of inner links each having a pair of inner plates and bushings, alternately and pivotably coupled together in the longitudinal direction of the chain by the pins rotatably inserted into the bushings, with a position restricting part positioned between each pair of the inner plates to restrict inward movement of each pair of inner plates in the chain width direction. The bushings are rotatably inserted in respective bushing holes of each pair of inner plates.

8 Claims, 5 Drawing Sheets

CHAIN

BACKGROUND OF THE INVENTION

1. Field of the Invention

The present invention relates to a chain composed of a plurality of inner links with bushings and a plurality of outer links with pins, alternately and pivotably coupled together in the longitudinal direction of the chain by the pins rotatably inserted in the bushings.

2. Description of the Related Art

Chains for use in chain transmissions, which use hollow cylindrical bushings, are known.

As shown in FIG. 5A and FIG. 5B, for example, some types of such chains include a plurality of outer links 210 each made up of a pair of left and right outer plates 211 coupled together by a pair of front and rear pins 215 with both ends thereof being pressed through pin holes 212 of the outer plates 211, and a plurality of inner links 220 each made up of a pair of left and right inner plates 221 coupled together by a pair of front and rear cylindrical bushings 225 with both ends thereof being pressed through bushing holes 222 of the inner plates 221.

The outer links 210 and inner links 220 are alternately and pivotably coupled together in the longitudinal direction of the chain by the pins 215 rotatably inserted in the bushings 225. Rollers 230 are rotatably fitted on the bushings 225, so that the rollers 230 of the chain 200 passed around a sprocket make contact with the sprocket teeth.

In the chain 200 with such a configuration, the bushings 225 are pressed through and fixed to the bushing holes 222 of the inner plates 221. A large force applied to the open edge of the bushing hole 222 can cause deformation of the inner plates 221 and distortion of the inside diameter of the bushings 225. This would accelerate friction wear caused by the sliding contact between the pins 215 and the bushings 225 and result in shortened service life of the chain.

The chain 200 with such a configuration may find application as a bicycle chain, in which case the chain may run out of alignment and bend in the width direction during use, for example as the chain transfers from one to another of sprockets arranged side by side in the width direction for a gear shift. The widthwise bendability of the chain depends on the clearance C1 between the outer circumferential surface of the pins 215 and the inner circumferential surface of the bushings 225. This clearance C1 causes the pins 215 and bushings 225 to slide against each other in constantly changing locations under varying conditions. The sliding parts are subjected to varying pressure which can frequently increase dramatically. This further accelerates the friction wear on the pins 215 and bushings 225.

Bushless chains for use in chain transmissions are also known (see, for example, Japanese Utility Model Application Publication No. H05-71506 and Japanese Patent Application Publication No. 2014-234881).

Japanese Utility Model Application Publication No. H05-71506 discloses an example of a conventional bushless chain, which has inner plates formed with drawn flanges that serve as bushing at either end. Inner links and outer links are pivotably coupled together by pins sliding against the inner plates. Also disclosed is a bushless chain that uses stepped pins for coupling together outer plates. Both ends of the stepped pins are rotatably inserted into pin holes of inner plates so that inner links and outer links are pivotably coupled together. Such a bushless chain is also disclosed in Japanese Patent Application Publication No. 2014-234881, which describes use of a pin having a pair of shaft portions fixed in pin holes of outer plates and loosely passed through pin holes of inner link plates, and a movement restricting portion formed more inward than the pair of shaft portions in the longitudinal direction of the pin for restricting inward movement of the inner link plates in the chain width direction.

SUMMARY OF THE INVENTION

Bushless chains have no components that are pressed through and fixed to the inner plates so that deformation of inner plates, which may subsequently shorten the service life of the chain, is less likely to occur.

Nevertheless, since the bushless chain is configured to be bendable by the sliding contact between the pins and inner plates, the widthwise bendability of the bushless chain depends on the clearance between the outer circumferential surface of the pins and the inner circumferential surface of the pin holes in the inner plates. Accordingly, similarly to bushed chains, bushless chains have the issue of difficulty in providing sufficient misalignment tolerance for applications in which the chain is bent in the width direction during use.

Bushless chains with flange portions serving as bushings entail the issue of increased burden in the machining process because machining the flange portions such as to avoid partial contact between the flange portions and the pins and rollers requires high precision. Lowered fatigue strength is also an issue with bushless chains having the flanged portions.

The present invention was made in view of the circumstances described above, and it is an object of the invention to provide a chain that is easy to assemble, has a longer life and smaller size, and allows larger tolerance for misalignment.

The present invention achieves the above object by providing a chain including: a plurality of outer links each having a pair of outer plates and pins; a plurality of inner links each having a pair of inner plates and bushings, the outer links and the inner links being alternately and pivotably coupled together in a longitudinal direction of the chain by the pins rotatably inserted into the bushings; and a position restricting part positioned between each pair of the inner plates to restrict inward movement of each pair of inner plates in a chain width direction, the bushings being rotatably inserted in respective bushing holes of each pair of inner plates.

According to the invention set forth in claim 1, the position restricting part restricts widthwise movement of the inner plates so that the bushings need not be pressed through and fixed to the inner plates. Deformation of the inner plates during assembly of the chain is less likely to occur, and strength degradation caused by internal distortion can be avoided. There is thus no need to add a structure for enhancing the strength, which leads to material waste reduction and size reduction. Moreover, the chain is easier to produce, as the process of pressing the bushings through the inner plates is no longer necessary.

The bushings are rotatably inserted in the bushing holes of the inner plates so that the bushings are less likely to undergo a change in the inner contour during assembly of the chain. The consistency of the inner contour of the bushings minimizes wear caused by partial contact between the pins and the bushings. Moreover, not only the pins are rotatably inserted into the bushings but also the bushings are rotatably inserted into the bushing holes of the inner plates, i.e., sliding contact points are dispersed, which also helps minimize wear.

The invention set forth in claim 1 thus enables an increase in strength and wear resistance of the chain, so that the durability of the chain can be improved and the service life can be prolonged.

The bendability of the chain in the width direction is increased by providing a clearance between the pin and the bushing as well as between the bushing and the inner plate. Therefore, the misalignment tolerance can be increased by adjusting these clearances, and wear resistance can be tuned by suitably combining the clearances for applications that involve bending of the chain in the width direction during use.

According to the invention set forth in claim 2, the position restricting part is formed by each roller, which means that the chain can be configured only by adjusting the sizes of various components, without significant changes in structure, of a chain commonly used in a chain transmission. Thus the production cost and work burden can be reduced.

According to the invention set forth in claim 3, the position restricting part is formed integrally with the bushings. No components are required to keep the inner plates in correct position so that the number of components can be reduced, and the number of production steps can also be reduced.

According to the invention set forth in claim 4, the function of restricting the position of the inner plates can be imparted to the bushings without making the bushing shape too complex so that the chain is readily producible.

According to the invention set forth in claim 5, the respective inner surfaces of the first bushing and second bushing can be finished with higher precision, so that the bushings can be prevented from making line contact, at the inner peripheral edge on either end thereof, with the outer circumferential surface of the pins. Therefore, wear caused by partial contact between the pins and the bushings can be reliably prevented.

According to the invention set forth in claim 6, the position restricting part is formed by each roller, which means that the chain can be configured only by adjusting the sizes of various components, without significant changes in structure, of a chain commonly used in a chain transmission. Thus the production cost and work burden can be reduced.

According to the invention set forth in claim 7, the position restricting part is formed integrally with each of the first bushings and second bushings. No components are required to keep the inner plates in correct position so that the number of components can be reduced, and the number of production steps can also be reduced.

According to the invention set forth in claim 8, the function of restricting the position of the inner plates can be imparted to the bushings without making the bushing shape too complex so that the chain is readily producible.

DESCRIPTION OF THE PREFERRED EMBODIMENTS

Below, the chain according to the embodiments of the present invention is described with reference to the drawings.

First Embodiment

Figure 1A:
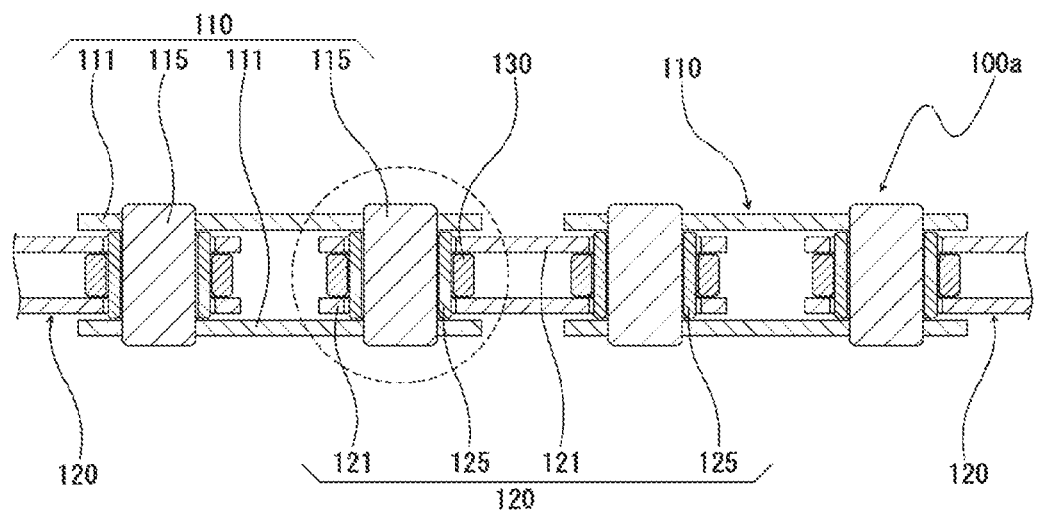
FIG. 1A is a schematic cross-sectional view illustrating part of one configuration example of a chain according to a first embodiment of the present invention.

FIG. 1A is a schematic cross-sectional view illustrating part of one configuration example of a chain according to the first embodiment of the present invention.

The chain 100a according to this embodiment is made up of a plurality of outer links 110 each having a pair of outer plates 111 and pins 115, and a plurality of inner links 120 each having a pair of inner plates 121 and bushings 125, alternately and pivotably coupled together in the longitudinal direction of the chain by the pins 115 rotatably inserted into the bushings 125.

The outer link 110 is made up of a pair of left and right outer plates 111 coupled together by a pair of front and rear pins 115 with both ends thereof being pressed through pin holes 112 of the outer plates 111. The outer plates 111 have a flat shape as a whole. The pins 115 are columnar with an axially uniform outside diameter.

The inner link 120 has a pair of front and rear bushings 125 with both ends thereof rotatably inserted into bushing holes 122 of the pair of left and right inner plates 121.

Figure 1B:
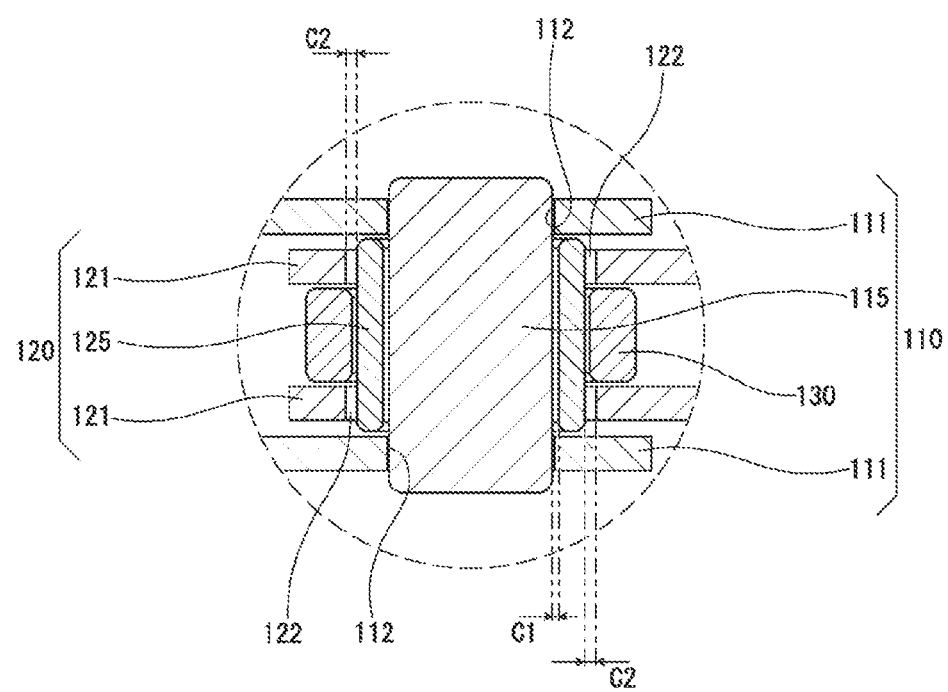
FIG. 1B is an enlarged view illustrating the part encircled with a broken line in FIG. 1A.

The bushing 125 is cylindrical with the outside diameter and inside diameter uniform in the chain width direction. The bushing 125 is configured such that there is a clearance C1 of a preset size between the inner circumferential surface of the bushing 125 and the outer circumferential surface of the pin 115 as shown in FIG. 1B.

The inner plates 121 have a flat shape as a whole. The bushing holes 122 are formed such that there is a clearance C2 of a preset size between the hole surface and the outer circumferential surface of the bushing 125.

The chain 100a according to this embodiment includes a position restricting part positioned between each pair of inner plates 121 to restrict inward movement of each pair of inner plates 121 in the chain width direction.

Rollers 130 rotatably fitted on the bushings 125 serve as the position restricting part. As the position restricting part is formed by the roller 130, the chain can be configured by only adjusting the sizes of various components, without significant changes in structure, of a chain commonly used in a chain transmission. Thus the production cost and work burden can be reduced.

As described above, the chain 100a according to the first embodiment includes a position restricting part that restricts inward movement of each pair of inner plates 121 in the chain width direction. The bushings 125 need not be pressed through the inner plates 121 and fixed thereto, because the position restricting part restricts widthwise movement of the inner plates 121. The configuration in which the bushings 125 are rotatably inserted in respective bushing holes 122 of the pairs of inner plates 121 prevents deformation of the inner plates 121 during assembly of the chain. Therefore, a drop in strength due to internal distortion can be avoided. There is thus no need to add a structure for reinforcing the chain, which leads to material waste reduction and size reduction. Moreover, the chain is easier to produce, as the process of pressing the bushings 125 through the inner plates 121 is no longer necessary.

Since the bushings 125 are rotatably inserted in the bushing holes 122 of the inner plates 121, the bushings 125 are less likely to undergo a change in the inner contour during assembly of the chain, i.e., the inner contour of the bushing 125 will be more consistent. Therefore, wear caused by partial contact between pins 115 and bushings 125 can be prevented. Moreover, not only the pins 115 are rotatably inserted into the bushings 125 but also the bushings 125 are rotatably inserted into the bushing holes 122 of the inner plates 121, i.e., sliding contact points are dispersed, which also helps minimize wear.

The chain 100a according to the first embodiment is increased in strength and wear resistance as described above, so that the durability of the chain 100a is improved and the service life prolonged.

The rollers 130 forming the position restricting part allow the chain to be produced with reduced cost and work burden because the chain can be configured only by adjusting the sizes of various components, without significant changes in structure, to a chain commonly used in a chain transmission.

The bendability of the chain in the width direction is increased by providing the clearance C1 between the pin 115 and the bushing 125 as well as the clearance C2 between the bushing 125 and the inner plate 121. Therefore, the misalignment tolerance can be increased, and wear resistance can be increased by adjusting these clearances C1 and C2 for applications that involve bending of the chain in the width direction during use.

A chain having rollers serving as the position restricting part has been described above as one example of the present invention. Alternatively, the chain according to the present invention may be configured such that the bushings themselves provide the function of restricting the position of inner plates.

Second Embodiment

Figure 2A:
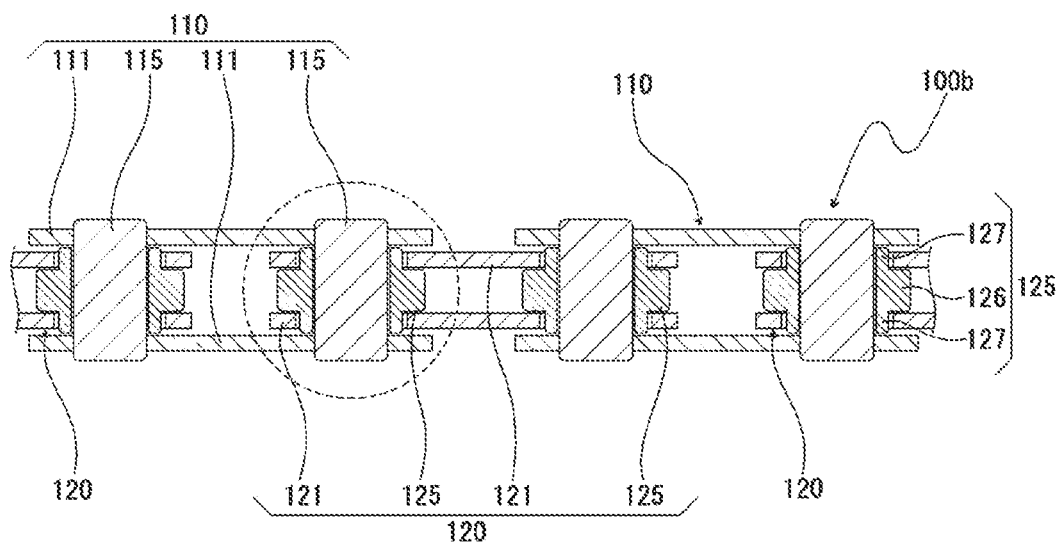
FIG. 2A is a schematic cross-sectional view illustrating part of one configuration example of a chain according to a second embodiment of the present invention.

FIG. 2A is a schematic cross-sectional view illustrating part of one configuration example of a chain according to the second embodiment of the present invention.

The chain 100b according to this embodiment has a position restricting part formed integrally with the bushing 125. The basic structure of this chain 100b is the same as the chain 100a according to the first embodiment. The same components are given the same reference numerals for convenience and description thereof will be omitted.

The bushing 125 used in the chain 100b according to this embodiment includes a radially expanded portion 126 positioned between the pair of inner plates 121 and having a larger outside diameter than the hole diameter of the bushing holes 122 in the inner plates 121, and a pair of shaft portions 127 extending in the chain width direction continuously from either end of the radially expanded portion 126 and rotatably inserted into the bushing holes 122 of the inner plates 121. The radially expanded portion 126 serves as the position restricting part that restricts inward movement of the inner plates 121 in the chain width direction.

Figure 2B:
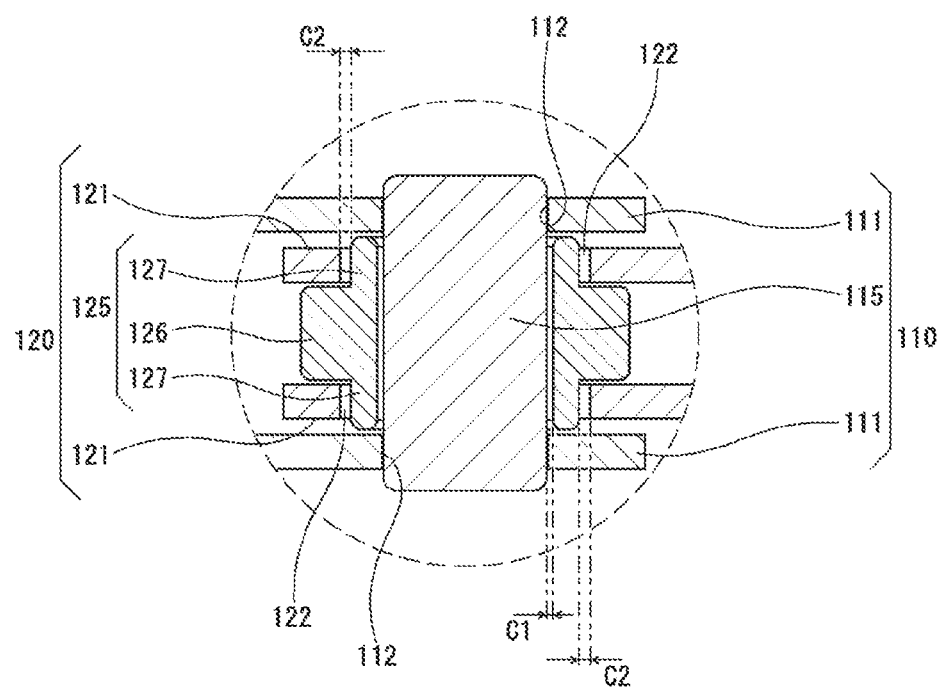
FIG. 2B is an enlarged view illustrating the part encircled with a broken line in FIG. 2A.

The bushing 125 has an inner circumferential surface conforming to the circumferential surface of a column, i.e., with the inside diameter uniform in the chain width direction. As shown in FIG. 2B, the bushing 125 is configured such that there is a clearance C1 of a preset size between the inner circumferential surface of the bushing 125 and the outer circumferential surface of the pin 115.

The shaft portions 127 of the bushing 125 are formed such that there is a clearance C2 of a preset size between the outer circumferential surface of the shaft portions and the inner circumferential surface of the bushing holes 122 in the inner plates 121.

In the chain 100b according to the second embodiment, the radially expanded portions 126 of the bushings 125 restrict inward movement of the inner plates 121 in the chain width direction, and the shaft portions 127 of the bushings 125 need not be pressed through and fixed to the inner plates 121.

Therefore, the chain 100b according to the second embodiment is easy to assemble, and can be increased in strength and reduced in size, similarly to the chain 100a according to the first embodiment. Likewise, the misalignment tolerance can be increased, and wear resistance can be improved.

Moreover, as the position restricting part is formed integrally with the bushings 125, no components are required to keep the inner plates 121 in correct position so that the number of components can be reduced, and the number of production steps can also be reduced. With the radially expanded portion 126 having a larger outside diameter than the hole diameter of the bushing holes 122, the function of restricting the position of the inner plates 121 can be imparted to the bushings 125 without making the bushing shape too complex, which makes the chain readily producible.

Third Embodiment

Figure 3A:
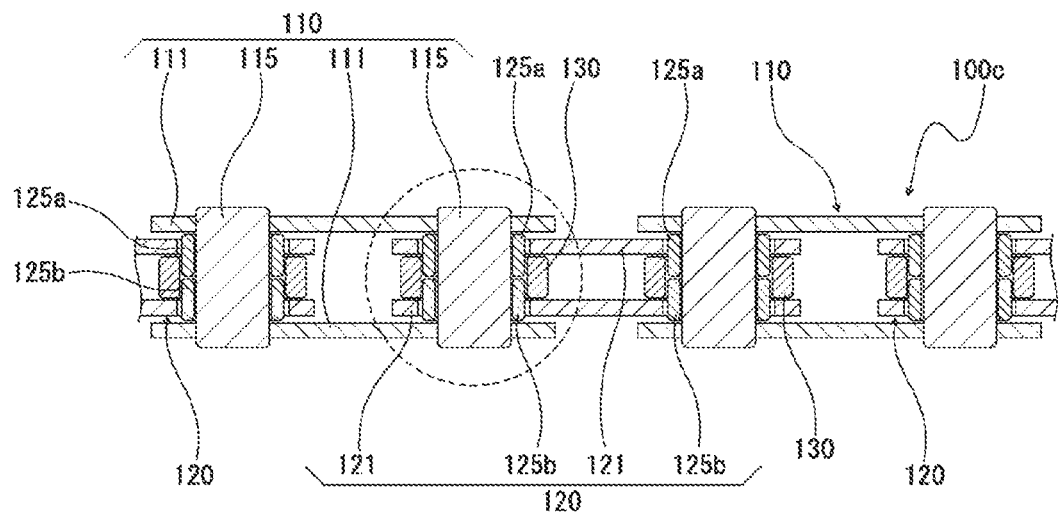
FIG. 3A is a schematic cross-sectional view illustrating part of one configuration example of a chain according to a third embodiment of the present invention.

FIG. 3A is a schematic cross-sectional view illustrating part of one configuration example of a chain according to the third embodiment of the present invention.

The chain 100c according to this embodiment uses two bushings rotatably fitted on each pin. In other words, each bushing is split in two in the chain width direction. The basic structure of this chain 100c is the same as the chain 100a according to the first embodiment. The same components are given the same reference numerals for convenience and description thereof will be omitted.

More specifically, the chain 100c according to this embodiment is configured as follows: The inner links 120 of this chain 100c each include pairs of a first bushing 125a and a second bushing 125b, each pair adjacent each other in the chain width direction and rotatably fitted on the same pin 115. The first bushings 125a and second bushings 125b each have an outer end rotatably inserted in a bushing hole 122 of one of each pair of the inner plates 121.

Figure 3B:
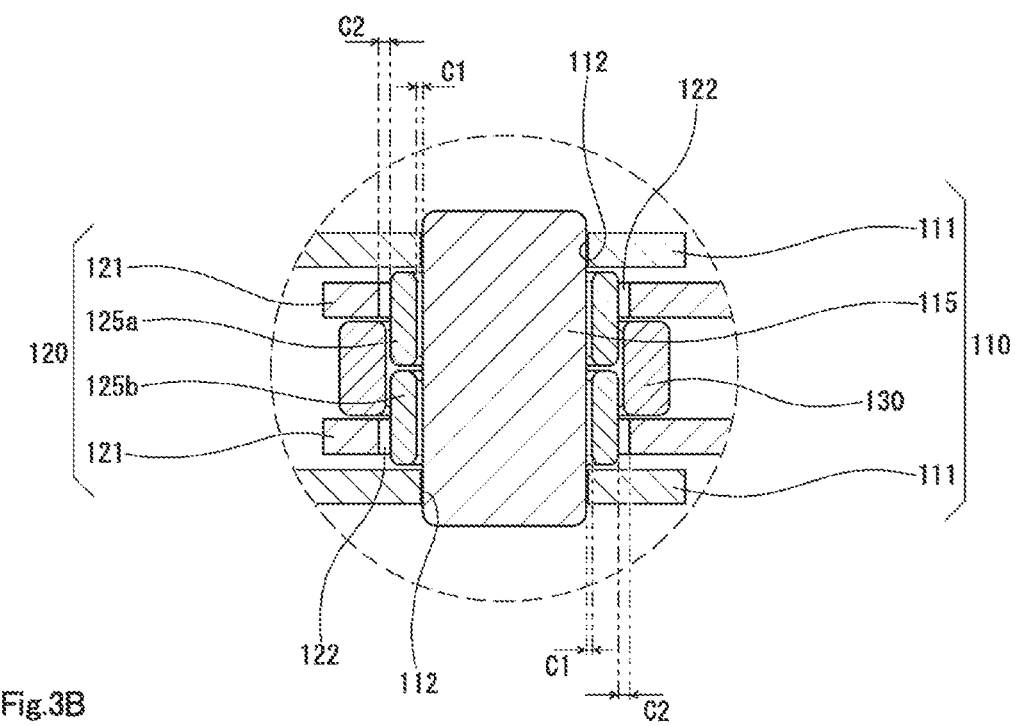
FIG. 3B is an enlarged view illustrating the part encircled with a broken line in FIG. 3A.

The first bushing 125a has an inner circumferential surface conforming to the circumferential surface of a column, i.e., with the inside diameter uniform in the chain width direction. As shown in FIG. 3B, the first bushing 125a is configured such that there is a clearance C1 of a preset size between the inner circumferential surface of the first bushing 125*a* and the outer circumferential surface of the pin 115.

The first bushing 125*a* is formed such that there is a clearance C2 of a preset size between the outer circumferential surface of the first bushing 125*a* and the inner circumferential surface of the bushing hole 122 in the inner plate 121.

Similarly to the first bushing 125*a*, the second bushing 125*b* is configured such that there is a clearance C1 of a preset size between the inner circumferential surface of the second bushing 125*b* and the outer circumferential surface of the pin 115, and there is a clearance C2 of a preset size between the outer circumferential surface of the second bushing 125*b* and the inner circumferential surface of the bushing hole 122 in the inner plate 121.

The chain 100*c* according to the third embodiment is easy to assemble, and can have longer service life and can be reduced in size, similarly to the chain 100*a* according to the first embodiment. Likewise, the misalignment tolerance can be increased, and wear resistance can be improved.

Splitting the bushing in two in the chain width direction enables the respective inner surfaces of the first bushing 125*a* and second bushing 125*b* to be finished with higher precision, so that the bushings can be prevented from making line contact, at the inner peripheral edge on either end thereof, with the outer circumferential surface of the pins 115. Therefore, wear caused by partial contact between the pins 115 and the first bushings 125*a* and second bushings 125*b* can be reliably prevented.

The rollers 130 forming the position restricting part allow the chain to be produced with reduced cost and work burden because the chain can be configured only by adjusting the sizes of various components, without significant changes in structure, to a chain commonly used in a chain transmission.

Fourth Embodiment

Figure 4A:
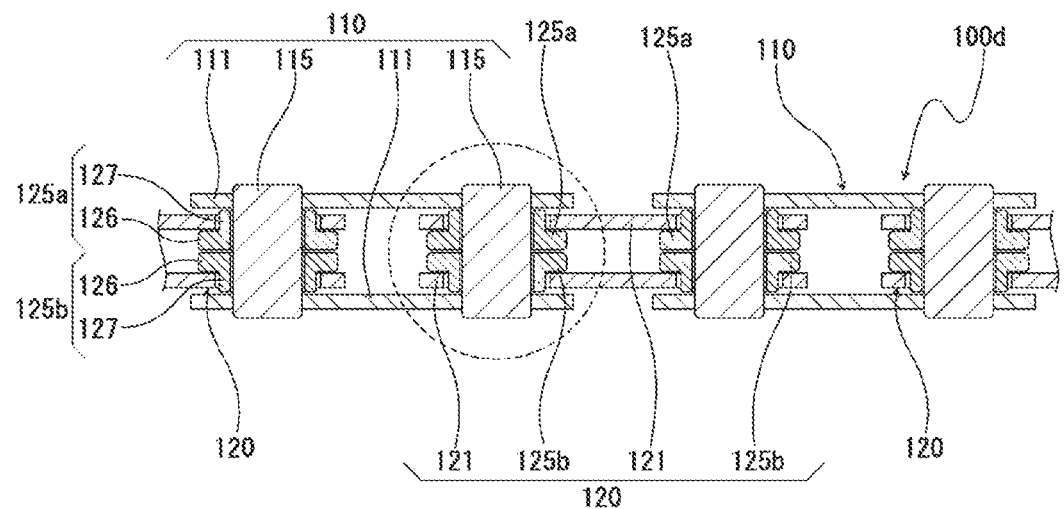
FIG. 4A is a schematic cross-sectional view illustrating part of one configuration example of a chain according to a fourth embodiment of the present invention.

FIG. 4A is a schematic cross-sectional view illustrating part of one configuration example of a chain according to the fourth embodiment of the present invention.

The chain 100*d* according to this embodiment uses two bushings rotatably fitted on each pin, with a position restricting part being formed integrally with each of the two bushings. The basic structure of this chain 100*d* is the same as the chain 100*a* according to the first embodiment. The same components are given the same reference numerals for convenience and description thereof will be omitted.

More specifically, the chain 100*d* according to this embodiment is configured as follows: The inner links 120 of this chain 100*d* each include pairs of a first bushing 125*a* and a second bushing 125*b*, each pair adjacent each other in the chain width direction and rotatably fitted on the same pin 115. The first bushings 125*a* and second bushings 125*b* each have an outer end rotatably inserted in a bushing hole 122 of one of each pair of the inner plates 121.

The first bushings 125*a* and second bushings 125*b* both include a shaft portion 127 extending in the chain width direction and rotatably inserted into the bushing hole 122 of the inner plate 121, and a radially expanded portion 126 radially extending outward from all around the inner end of the shaft portion 127 and having a larger outside diameter than the hole diameter of the bushing hole 122 in the inner plate 121. The radially expanded portion 126 serves as the position restricting part that restricts inward movement of the inner plates 121 in the chain width direction.

Figure 4B:
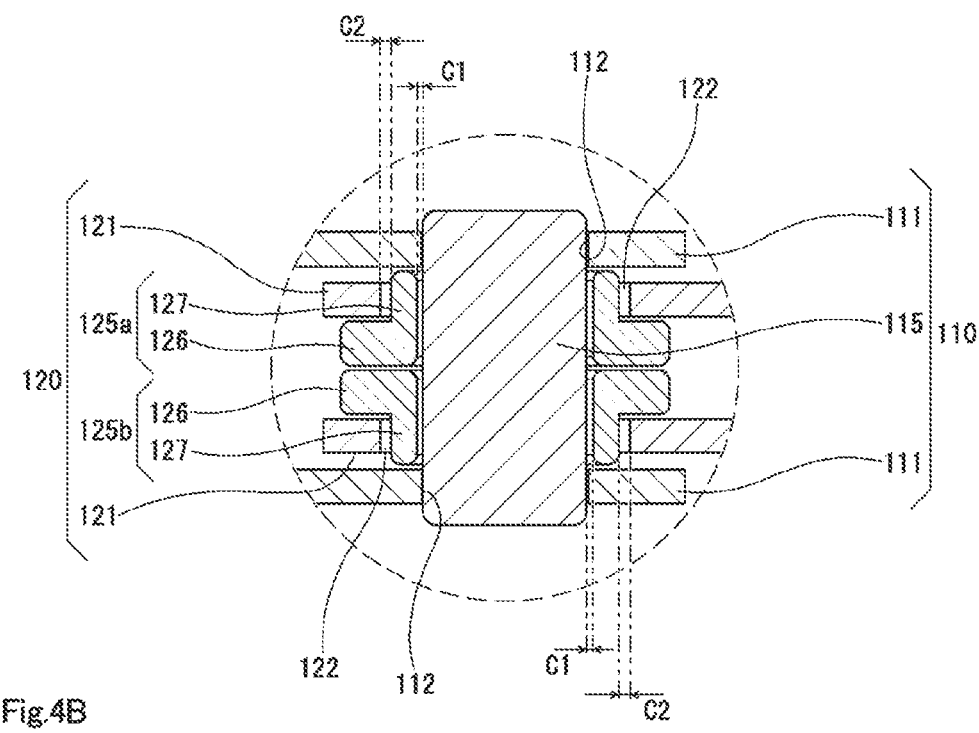
FIG. 4B is an enlarged view illustrating the part encircled with a broken line in FIG. 4A.
Figure 5A:
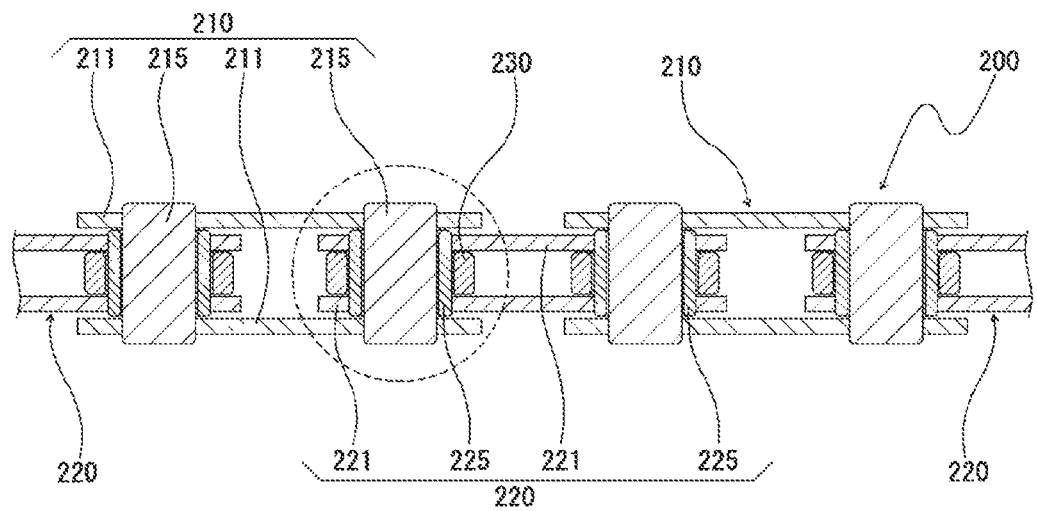
FIG. 5A is a schematic cross-sectional view illustrating part of one configuration example of a conventional chain.
Figure 5B:
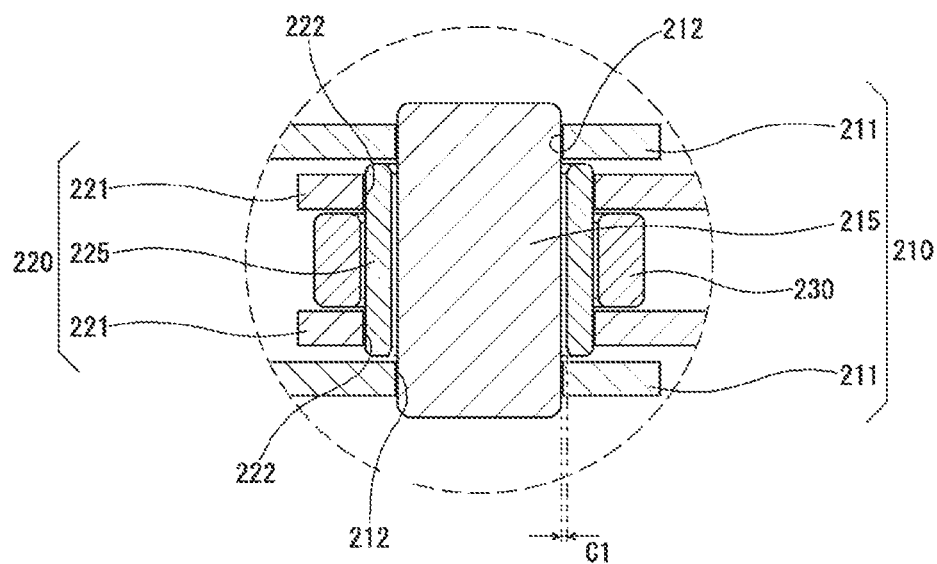
FIG. 5B is an enlarged view illustrating the part encircled with a broken line in FIG. 5A.

The first bushing 125*a* has an inner circumferential surface conforming to the circumferential surface of a column, i.e., with the inside diameter uniform in the chain width direction. As shown in FIG. 4B, the first bushing 125*a* is configured such that there is a clearance C1 of a preset size between the inner circumferential surface of the first bushing 125*a* and the outer circumferential surface of the pin 115.

The first bushing 125*a* is formed such that there is a clearance C2 of a preset size between the outer circumferential surface of the shaft portion 127 and the inner circumferential surface of the bushing hole 122 in the inner plate 121.

Similarly to the first bushing 125*a*, the second bushing 125*b* is configured such that there is a clearance C1 of a preset size between the inner circumferential surface of the second bushing 125*b* and the outer circumferential surface of the pin 115, and there is a clearance C2 of a preset size between the outer circumferential surface of the shaft portion 127 of the second bushing 125*b* and the inner circumferential surface of the bushing hole 122 in the inner plate 121.

The chain 100*d* according to the fourth embodiment is easy to assemble, and can have longer service life and can be reduced in size, similarly to the chain 100*a* according to the first embodiment. Likewise, the misalignment tolerance can be increased, and wear resistance can be improved.

Splitting the bushing in two in the chain width direction enables the respective inner surfaces of the first bushing 125*a* and second bushing 125*b* to be finished with higher precision, so that the bushings can be prevented from making line contact, at the inner peripheral edge on either end thereof, with the outer circumferential surface of the pins 115. Therefore, wear caused by partial contact between the pins 115 and the first bushings 125*a* and second bushings 125*b* can be reliably prevented.

Moreover, as the position restricting part is formed integrally with each of the first bushings 125*a* and second bushings 125*b*, no components are required to keep the inner plates 121 in correct position so that the number of components can be reduced, and the number of production steps can also be reduced. With the radially expanded portion 126 having a larger outside diameter than the hole diameter of the bushing holes 122, the function of restricting the position of the inner plates 121 can be imparted to the first bushings 125*a* and second bushings 125*b* without making the bushing shape too complex, which makes the chain readily producible.

As described above, in any of the chains 100*a*, 100*b*, 100*c*, and 100*d* according to the first to fourth embodiments, the clearance C1 between the pin 115 and the bushing 125 (or clearance C1 between the pin 115 and the first and second bushings 125*a* and 125*b*) and the clearance C2 between the bushing 125 and the inner plate 121 (or clearance C2 between the shaft portions 127 of the first and second bushings 125*a* and 125*b*, and the inner plate 121) increase the bendability of the chain in the width direction. Therefore, the misalignment tolerance can be increased as well as wear resistance can be improved by adjusting these clearances C1 and C2 for applications that involve bending of the chain in the width direction during use. Thus the chain according to the present invention is advantageously used for whatever purpose, e.g., for application as a bicycle chain.

While embodiments of the present invention have been described in detail, the present invention is not limited to the above-described embodiments and may be carried out with various design changes without departing from the scope of the present invention set forth in the claims.

For example, the chain can be in any form as long as it is made up of a plurality of link plates pivotably coupled together by connecting pins, e.g., a silent chain.

What is claimed is:

1. A chain comprising:
   a plurality of outer links each having a pair of outer plates and pins;
   a plurality of inner links each having a pair of inner plates and bushings, the outer links and the inner links being alternately and pivotably coupled together in a longitudinal direction of the chain by the pins rotatably inserted into the bushings; and
   a position restricting part positioned between each pair of the inner plates to restrict inward movement of said each pair of inner plates in a chain width direction,
   the bushings being rotatably inserted in respective bushing holes of said each pair of inner plates,
   wherein a clearance is formed between an inner circumferential surface of the bushing holes and an outer circumferential surface of the bushings, respectively.

2. The chain according to claim 1, wherein the position restricting part is formed by a roller rotatably fitted on each of the bushings.

3. The chain according to claim 1, wherein the position restricting part is formed integrally with the bushings.

4. The chain according to claim 3, wherein the bushings each include a radially expanded portion having a larger outside diameter than a hole diameter of the bushing holes, and a shaft portion extending in the chain width direction continuously from either end of the radially expanded portion and rotatably inserted into the bushing holes, the radially expanded portion forming the position restricting part.

5. The chain according to claim 1, wherein the inner links each include a first bushing and a second bushing rotatably fitted on a same pin,
   the first bushing and the second bushing each being rotatably inserted in a bushing hole of one of said each pair of inner plates.

6. The chain according to claim 5, wherein the position restricting part is formed by a roller rotatably fitted on each pair of the first bushing and the second bushing arranged side by side in the chain width direction.

7. The chain according to claim 5, wherein the position restricting part is formed integrally with each of the first bushing and the second bushing.

8. The chain according to claim 7, wherein the first bushing and the second bushing each include a shaft portion inserted into a bushing hole of the inner plate, and a radially expanded portion having a larger outside diameter than a hole diameter of the bushing hole and formed at one end of the shaft portion on an inner side in the chain width direction,
   the radially expanded portion of the first bushing and the radially expanded portion of the second bushing forming the position restricting part.

* * * * *